United States Patent [19]

Jacques, Jr. et al.

[11] 4,286,246
[45] Aug. 25, 1981

[54] HEAT-UP/COOL-DOWN BIMETAL TIMER FOR ELECTRIC TOASTER

[75] Inventors: Joseph L. Jacques, Jr., Bethlehem; Michael D. Smith, Allentown; Gregory C. Yehl, Wescosville, all of Pa.

[73] Assignee: General Electric Company, New York, N.Y.

[21] Appl. No.: 110,813

[22] Filed: Jan. 10, 1980

[51] Int. Cl.³ .................. F27D 11/02; F16B 21/02; H01H 43/30
[52] U.S. Cl. ................... 337/94; 219/413; 411/437; 411/528
[58] Field of Search ............ 219/398, 405, 413; 337/82, 94, 360; 85/32 V, 36

[56] References Cited

U.S. PATENT DOCUMENTS

| | | | |
|---|---|---|---|
| 1,785,406 | 12/1930 | Cornett | 74/424.8 B |
| 1,998,296 | 4/1935 | Walker | 85/36 |
| 2,026,949 | 1/1936 | McMahan | 85/36 |
| 2,149,719 | 3/1939 | Arnest | 220/3.4 |
| 2,156,003 | 4/1939 | Tinnerman | 85/36 |
| 2,393,764 | 1/1946 | Frank | 74/424.8 A |
| 2,522,057 | 9/1950 | Owens | 220/243 |
| 2,874,877 | 2/1959 | Spencer | 222/162 |
| 2,917,966 | 12/1959 | Kahn | 85/32 |
| 3,073,368 | 1/1963 | Meyer | 151/41.75 |
| 3,570,361 | 3/1971 | Tinnerman | 85/32 |
| 3,583,274 | 6/1971 | Duffy | 85/32 |
| 3,638,700 | 2/1972 | Onufer | 151/69 |
| 3,684,860 | 8/1972 | Snyder | 219/413 |
| 3,841,196 | 10/1974 | Tinnerman | 85/36 R |
| 3,844,518 | 10/1974 | Long | 248/188.4 |
| 4,067,256 | 1/1978 | Turner | 85/32 V |
| 4,178,498 | 12/1979 | Snyder | 219/413 |

FOREIGN PATENT DOCUMENTS 115149  10/1945  Sweden ..................... 85/36

*Primary Examiner*—William H. Beha, Jr.
*Attorney, Agent, or Firm*—Leonard J. Platt; George R. Powers; John F. Cullen

[57] ABSTRACT

A heat-up/cool-down bimetal timer for an electric toaster wherein a unique screw fastener is provided for holding a calibration adjustment screw without being deformed during automated adjustment of the screw. The fastener is made from a blade of spring sheet metal that has an end turned on itself in the form of a cylinder for holding the calibration screw. Thus, the axis of the screw is parallel to or even in line with a plane that lies midway between the planes of the major surfaces of the sheet metal fastener. Accordingly, any automated screw driving equipment that may push downwardly on the head of the screw for adjusting it normally would not flex or bend the fastener in a plane perpendicular to one of its major flat surfaces.

6 Claims, 5 Drawing Figures

HEAT-UP/COOL-DOWN BIMETAL TIMER FOR ELECTRIC TOASTER

BACKGROUND OF THE INVENTION

1. Field of the Invention

This invention relates to a heat-up/cool-down bimetal timer for an electric toaster, and more particularly, to an improved fastener for a calibration adjustment screw that is not readily deformed during adjustment of the screw.

2. Description of the Prior Art

In a heat-up/cool-down bimetal timer disclosed in a prior U.S. Pat. No. 3,684,860 issued Aug. 15, 1972 and assigned to the same assignee as the instant invention, there is disclosed a heat-up/cool-down bimetal timer for timing the toasting cycle of an electric toaster wherein a calibration screw 128 functions as a contact that is engaged by a moveable contact 124 at the end of a heat-up/cool-down bimetal blade 120 for signalling the termination of the bimetal cool-down cycle when the contact 124 at the end of the bimetal abuts the contact on the end of the adjusting screw. As shown more particularly in FIGS. 10, 11, and 12 of the patent, it can be appreciated that the adjusting screw 126 may be adjusted during manufacture of the heat-up/cool-down bimetal and that the timer cycled may be shortened by moving the end of the screw 128 closer to the contact 124 at the end of the bimetal blade 120 of the heat-up/cool-down bimetal timer. Manufacturing adjustment of the screw may be achieved by having automated screw driving equipment move into engagement with the head of the screw to rotate the screw clockwise to move the contact tip of the screw closer to contact 124. After the desired adjustment, the automated equipment is removed from the head of the screw and the fastener through which the screw is threaded holds the screw in its adjusted position.

As illustrated in FIG. 10 of the patent, the fastener comprises a strip of sheet metal that is secured to a bracket 186. The screw 126–128 is threaded through an aperture that is formed in the sheet metal fastener and is held in adjusted position by means of spring fingers that depend downwardly from the fastener toward the aperture. The principal surface of the sheet metal fastener is arranged generally perpendicular to the screw and to forces that automated equipment might apply to the head of the screw as it is moved into engagement with the head of the screw. Too strong forces would tend to bend the fastener about its connection with the bracket 186.

Our invention is concerned with such calibration adjusting screw fasteners, and more particularly, to a unique sheet metal fastener which is not readily deformed while the adjusting screw is being adjusted.

Accordingly, it is a particular object of our invention to provide an improved calibration adjustment screw and fastener for a heat-up/cool-down bimetal timer which may be readily manufactured of relatively few parts. It is another object of our invention to provide an improved calibration screw and fastener for precisely locating the screw and maintaining the screw in good alignment with a contact with which it cooperates.

It is also an object of our invention to provide a fastener that has a constant frictional drag to hold the screw in its adjusted position. It is a still further object of our invention to provide a fastener and adjustment screw which may be adjusted by automated manufacturing equipment and lends itself to less critical methods of manufacture and tolerances as compared to other known constructions.

SUMMARY OF THE INVENTION

A heat-up/cool-down bimetal timer for an electric toaster includes a rigid body member, a bimetal blade having one of its end portions connected to the rigid body member and the other end portion having a contact arranged for cooperation with a contact that is held in a fixed position on the timer body member. The fixed contact is adjustable during manufacture of the timer for precisely setting the time periods of the heat-up/cool-down bimetal timer by setting the distance that the free end portion of the bimetal has to move in order to close the switch contacts which signal the termination of the bimetal timer cool-down cycle and the de-energization of the electric heaters of the toaster. The fixed contact is conventionally provided at the tip portion of an adjustment screw and the calibration adjustment screw is generally cylindrical in shape has a longitudinal axis and screw threads are formed on the periphery of the cylindrical body portion. The screw also includes a head portion that is shaped for engagement with screw driving calibration equipment for automatically driving the screw to its adjusted position.

In accordance with our invention, a leaf spring fastener for holding the adjustment screw has two end portions, one end portion is fixed to the rigid body member of said timer and the other end portion is turned on itself in the general shape of a cylindrical sleeve for contact with the outer periphery of the screw threads. The leaf spring fastener is formed from a piece of generally flat spring metal and thus, it has two generally flat parallel major surfaces and edge surfaces. Both of the major flat surfaces are in planes that are generally parallel to the longitudinal axis of the screw and are arranged generally perpendicular to the major surface of the heat-up/cool-down bimetal blade and the contact mounted on the free end portion of the blade. Moreover and most importantly, the direction of the movement of the screw driving equipment for engaging the head of the screw is in a direction toward an edge surface of the fastener rather than a major plane fastener of the fastener so that the fastener will not be bent or deformed when it is being engaged by screw driving equipment for adjusting the screw.

With this construction, it can be appreciated that the contact at the tip of the adjusting screw may be precisely located and maintained in good alignment with the contact at the end of the bimetal blade with which it cooperates. There is no tendency to bend the fastener about one of its major surfaces to cause improper adjustment or changes in adjustment after the screw driving equipment has been removed from the adjusting screw by having a deformed fastener returned to its former position.

Moreover, since the fastener is relatively rugged and rigid with respect to forces that are directed toward one of its edge surfaces, the fastener construction lends itself to use with manufacturing equipment with lower tolerances as compared with other known constructions.

In addition, with this construction, the fastener may be manufactured with a single part that may be readily formed. It is merely necessary to shape a sheet of metal blade to include a cylindrical end portion that is spring urged into the engagement with surfaces of the screw threads.

Moreover, with this cylindrical holder arrangement a readily formed spring finger may be provided adjacent to the cylindrical portion so that it may be spring urged into engagement with the surfaces of adjacent screw threads. Thus, constant frictional force is provided on the screw threads and the screw so that it stays in its adjusted position during substantial temperature variations and vibrations that are inherently present in an electric toaster oven.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
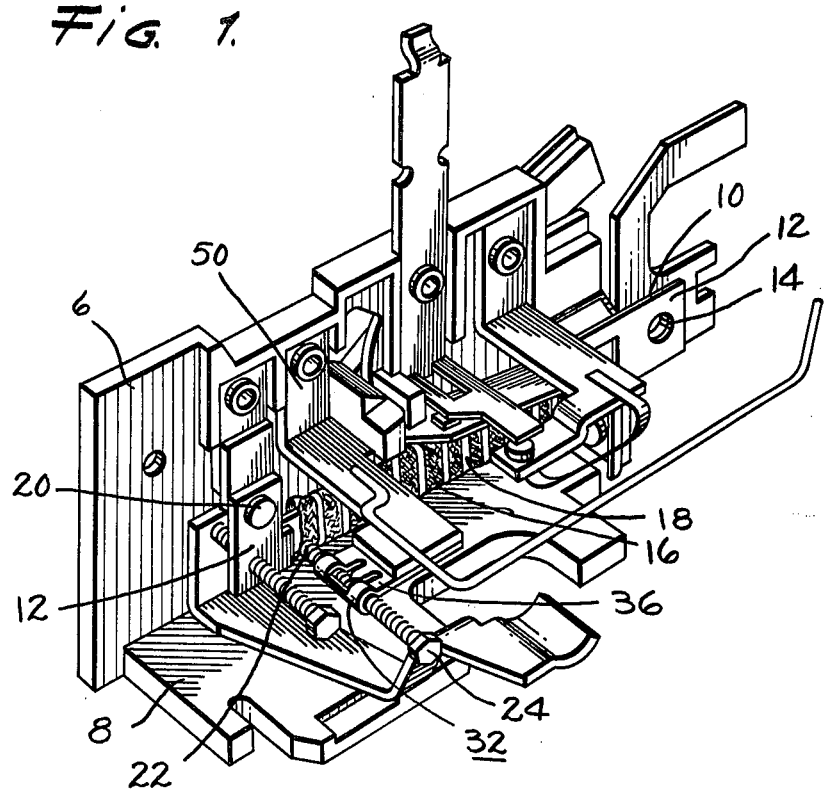
FIG. 1 is a perspective view of a heat-up/cool-down bimetal timer including a calibration screw and fastener constructed in accordance with our invention.
Figure 2:
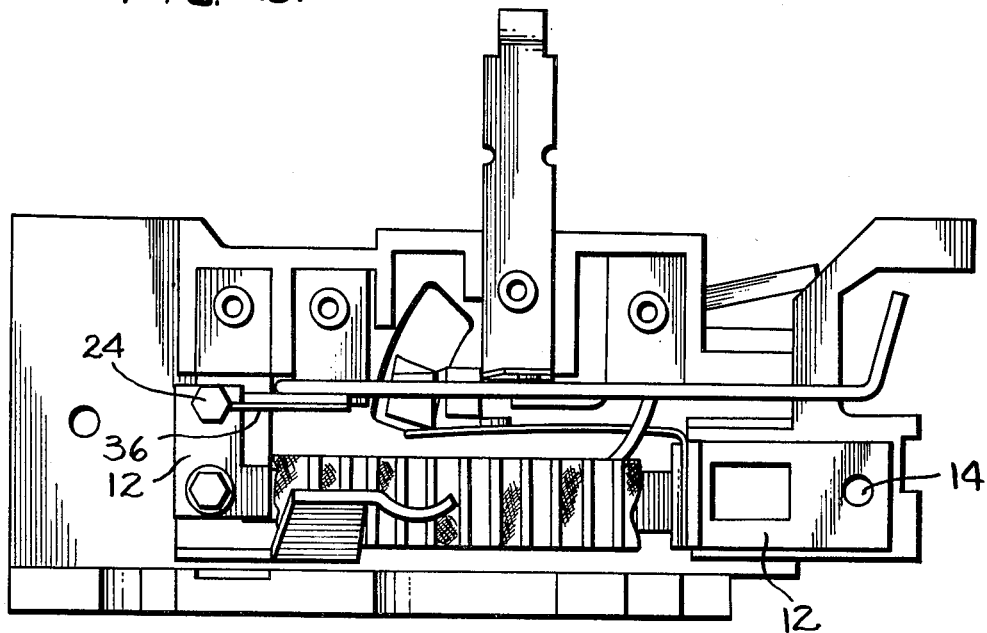
FIG. 2 is a side elevational view of the heat-up/cool-down bimetal timer illustrated in FIG. 1.

Referring now to the drawing and first particularly to FIG. 1, there is shown a heat-up/cool-down bimetal timer which includes our unique fastener and calibration screw. In a manner known in the art and as shown in the aforementioned U.S. Pat. No. 3,684,860 a bimetal timer may include an "L" shaped body member formed of a piece of phenolic or other suitable insulating material. The rigid body member including a generally flat horizontal wall portion 8 and a generally vertical wall portion 6. The vertical wall portion 6 includes an outwardly extending projection 10 for mounting a bimetal blade 12 by means of a rivet 14.

A sleeve of insulating material 16 is positioned around the bimetal 12 and a heater wire 18 is wrapped around the insulating material in order to heat the bimetal. Suitable switches are provided for energizing and de-energizing the bimetal heater wire 18. After the bimetal 12 has been heated and it starts to cool down, it moves outwardly away from the vertical wall 6 of the bimetal body portion. A contact 20 is fixed to the free end of the bimetal 12 for cooperating with a contact 22 that is located at the tip or inner end of a calibration adjustment screw to signal the termination of the bimetal timer cool-down cycle and the termination of the toasting period. Conventionally, when contact 20 moves outwardly away from wall 6 to touch contact 22 a solenoid may be energized to open a switch to the main heaters of the toaster oven.

In a manner known in the art a toast color control may be operated by the user of the toaster appliance in order to set the desired toast color and this manual user adjustment conventionally sets the start of the bimetal cool-down cycle. Naturally, the sooner the cool-down cycle of the bimetal is started, the shorter the toasting interval and the lighter the color of the toast. The end of the bimetal cool-down cycle is usually determined by a preset manufacturing adjustment which should remain fixed during the life of the toaster appliance. This adjustment has been achieved by moving the contact end 22 of the calibration screw 24 closer to or further away from the contact 20 on the end of the bimetal blade 12 with which it cooperates. The overall construction and operation of the heat-up/cool-down bimetal timer for a toaster does not form a part of this invention and is described and illustrated in greater detail in the aforementioned U.S. Pat. No. 3,684,860, assigned to the same assignee as the present invention.

CALIBRATION SCREW AND RETAINER

In accordance with our invention, a unique calibration screw and retainer is incorporated in a prior art heat-up/cool-down bimetal timer for precisely locating the position of the fixed contact that cooperates with a moveable contact at the end of a heat-up/cool-down bimetal blade for signalling the termination of the bimetal cool-down cycle.

Figure 4:
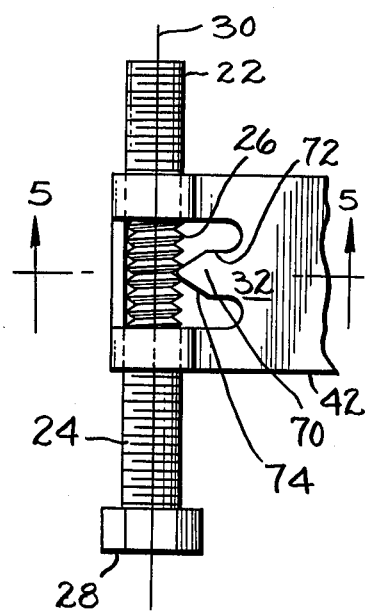
FIG. 4 is a fragmentary top plan view of the fastener and calibration screw illustrated in FIG. 1.
Figure 5:
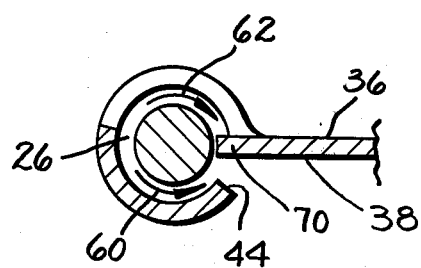
FIG. 5 is a fragmentary cross-sectional view of the fastener and adjusting screw taken substantially on the plane of 5—5 of FIG. 4.

As shown more particularly in FIGS. 4 and 5, a cylindrical calibration adjustment screw 24 is provided with a circular contact 22 at its inner or tip end for cooperating with the contact 20 at the free end of the bimetal blade 12. The screw 24 has a longitudinal axis 30 and conventionally a plurality of screw threads 26 are located outwardly from the longitudinal axis along the periphery of the cylindrical screw. The screw 24 may also conventionally include a hexagonal head 28 which is suitable for engagement by automated equipment which turns the screw the desired amount to precisely set the relative position of contact 22 with respect to contact 20 and the rigid body member 6 of the heat-up/cool-down bimetal timer. It can be appreciated that when automated equipment is moved into position to abut the head 28 of the screw, the equipment will tend to force the screw inwardly along its longitudinal axis.

In accordance with my invention, a unique fastener 32 is provided for holding the screw 24 so that when the head is engaged by the equipment the fastener will be sufficiently rigid in the direction in which the equipment force is being applied so that it will not be deformed by the adjusting equipment.

Figure 3:
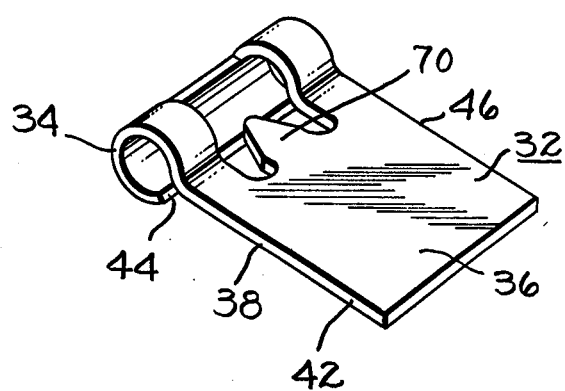
FIG. 3 is a perspective view of the fastener for holding the calibration screw illustrated in FIG. 1.

As shown more particularly in FIGS. 1, 3, and 4, the fastener 32 may be made from relatively inexpensive sheet spring metal having one end 34 which may be readily turned on itself to form a cylindrical sleeve for holding the threaded portion 26 of the screw 24. It can be appreciated that the spring fastener has two generally flat parallel major surfaces 36 and 38, and four edge surfaces 40, 42, 44, and 46.

The rigid body portion of the heat-up/cool-down bimetal timer includes an "L" shaped metal bracket 50 that is suitably riveted to the vertical phenolic wall 6 of the bimetal timer. As shown more particularly in FIG. 1, it can be appreciated that the upper flat major surface 36 of the fastener may be suitably riveted or welded to the underside of the bracket 50 in order to fix the position of the fastener 32.

With the aforedescribed relationship between the screw and the fastener, the direction of movement of equipment for engaging the head of the screw is in a direction toward an edge 42 of the fastener, and since the fastener 32 is relatively rigid to forces that are applied to its edge surfaces, the fastener will not be deformed when it is being engaged by the automated equipment for adjusting the screw.

With particular reference to FIGS. 3 and 4, it can be appreciated that the cylindrical sleeve holder 34 for the adjustment screw 24 is an expandable member that contains an effective slot between its edge surface 44 and its lower major plane surface 38. It can also be appreciated that the leaf spring fastener is curled or turned on itself in a counter-clockwise direction 60 which is opposite to the clockwise direction 62 for rotating the screw to its adjusted position by the automated equipment. With this arrangement, when the screw is being rotated in the direction 62 to its adjusted position, friction forces between the outer periphery of the screw threads and the inside surfaces of the cylindrical retainer will tend to move the edge surface 44 away from the major surface 38 to expand the cylindrical portion 34 of the fastener, and thereby, make it relatively easy to move the screw in the screw advancing direction. Conversely, with this construction, it is desirably more difficult to back-off the screw and move it in the direction illustrated by the arrow 60. In reversing the direction of the movement of the screw as shown by arrow 60, it can be seen that friction forces between the periphery of the screw threads and the inner cylindrical surface of the retainer 34 will tend to move the surface 44 closer to the lower surface 38, thereby tending to contract the cylindrical portion 34 of the fastener and increase friction on the periphery of the screw.

In accordance with my invention, a unique arrangement is also provided for holding the adjustment screw 24 in its adjusted position. A flexible metal spring finger 70 extends from a mid-portion of the retainer 32 generally radially inwardly toward the longitudinal axis of the screw 24 and even beyond the root diameter of the screw threads so that its side surfaces 72 and 74 are in spring contact with adjacent screw threads when a screw 24 is positioned in the fastener. With this construction, the screw 24 is held in adjusted position after the automated equipment has been removed from the head 28. It can be appreciated that when the adjustment screw is moved in the clockwise direction of arrow 62, friction forces between the screw threads and the side edges 72 and 74 of the finger 70 will move the finger somewhat downwardly from the position illustrated in FIG. 5 and when rotation of the screw 24 is stopped, the finger 70 will be urged generally radially inwardly toward the root diameter of the screw threads 26 to securely hold the screw 24.

It can also be appreciated that the finger 70 also provides substantial resistance to reverse direction of screw travel after the screw is located in its calibrated position. The reverse direction forces in the direction of arrow 60 will have to be sufficient to flip finger 70 from its slight downward location over the longitudinal axis of the screw to position it upwardly on the screw threads as viewed in FIG. 5.

From the foregoing description it will be appreciated that our improved fastener 32 provides a rugged holder for a calibration screw 24. It is not readily deformed during manufacturing adjustment of the screw and the screw may be maintained in good alignment with a contact at the end of a bimetal blade with which it cooperates.

Moreover, the spring finger 70 provides a constant frictional drag to hold the screw 24 in its adjusted position even with the temperature variations and vibrations that are inherently present in an electric toaster.

In addition, the fastener 32 may be readily formed from a single piece of sheet metal. It is merely necessary to stamp an aperture in the sheet metal to form the outwardly extending finger 70 and turn that end of the fastener on itself to form its cylindrical portion 34 that holds the screw 24. Thus, an exceedingly simple and reliable fastener is achieved by uniquely forming one piece of sheet metal.

We claim:

1. In a heat-up/cool-down bimetal timer for an electric toaster wherein the timer includes a rigid body member, a bimetal blade having two end portions with one of the end portions being connected to the rigid body member and the other end portion being a free end portion and, a switch contact located at the free end portion of the bimetal blade arranged for cooperation with a contact that is held in a fixed position on said timer body member, the fixed switch contact being adjustable during manufacture of the timer for precisely setting the time periods of the heat-up/cool-down bimetal timer by setting the distance that the free end portion of the bimetal has to move in order to close the switch contacts which signal the termination of the bimetal timer cool-down cycle and the de-energization of the electric heaters of the toaster, the improvement comprising:

(a) a calibration adjustment screw having longitudinal axis and a generally cylindrical body portion with screw threads formed thereon, an end portion constituting the manufacturing adjustable switch contact, and a head portion shaped for engagement with calibration equipment for driving the screw to its adjusted position;

(b) a leaf spring fastener for holding the adjustment screw having two end portions, one end portion being fixed to the rigid body member of said bimetal timer and the other end portion being turned on itself in the general shape of a cylindrical sleeve for contact with the outer periphery of the screw threads;

(c) said leaf spring fastener being formed from a piece of generally flat spring metal having two generally flat parallel major surfaces and edge surfaces, both of the major flat surfaces being in planes generally parallel to the longitudinal axis of the screw and being arranged generally perpendicular to the major surfaces of the heat-up/cool-down bimetal blade so that said bimetal blade and the contact mounted on the free end portion thereof face an edge surface of said fastener and the direction of movement of equipment for engaging the head of the screw is in a direction toward an edge surface of the fastener so that said fastener will not be deformed when it is being engaged by equipment for adjusting the screw;

2. A heat-up/cool-down bimetal timer as defined in claim 1 wherein:

said fastener is curled in the form of a cylindrical sleeve in a direction opposite to the direction of rotation for advancing the adjusting screw to its calibrated position so that frictional forces between the threads of the adjusting screw and its cylindrical holder will tend to open the cylinder and increase its diameter thereby making it relatively easy to rotate the screw in the screw advancing direction, and rotation of the screw in a reverse direction will increase frictional resistance because the frictional force between the screw threads and the cylindrical fastener will tend to reduce the diameter of the cylindrical fastener.

3. A heat-up/cool-down bimetal timer as defined in claim 1 wherein:
said leaf spring fastener includes a projection which is arranged generally perpendicular to the longitudinal axis of the screw and is provided with edge surfaces that are spring urged between the surfaces of adjacent screw threads in order to hold the screw in its calibrated adjusted position upon removal of the adjusting equipment.

4. A heat-up/cool-down bimetal timer as defined in claim 1 wherein:
said fastener is connected to said rigid timer body member by connecting one of the major flat surfaces to a portion of the rigid timer body member.

5. A fastener construction comprising:
(a) rigid body member;
(b) a calibration adjustment screw having a longitudinal axis, a generally cylindrical body portion, an end portion, and a head portion shaped for engagement with calibration equipment for automatically driving the screw to its adjusted position;
(c) a leaf spring fastener for holding the adjustment screw having two end portions, one end portion being connected to the rigid body member and the other end portion being turned on itself in the general shape of a cylindrical sleeve for gripping the outer periphery of the screw threads;
(d) said leaf spring fastener being formed from a piece of generally flat spring metal having two major flat surfaces and edge surfaces, both of the major flat surfaces being in planes generally parallel to the longitudinal axis of the screw so that the direction of movement of equipment for engaging the head of the screw is in a direction toward an edge surface of the fastener so that said fastener will not be deformed when it is being engaged by equipment for adjusting the screw;
(e) said leaf spring fastener including a projection which is arranged generally perpendicular to the longitudinal axis of the screw and being provided with edge surfaces that are spring urged between the surfaces of adjacent screw threads in order to hold the screw in its calibrated adjusted position upon removal of the adjusting equipment.

6. A fastener assembly as defined in claim 5 wherein:
said leaf spring fastener is curled in the form of a cylindrical sleeve in a direction opposite to the direction of rotation for advancing the adjusting screw to its calibrated position so that friction forces between the threads of the adjusting screw and its cylindrical fastener will tend to open the cylinder and increase its diameter thereby making it relatively easy to rotate the screw in the screw advancing direction, and rotation of the screw in a reverse direction will increase the frictional resistance because the frictional force between the screw threads and the cylindrical fastener will tend to reduce the diameter of the cylindrical fastener.

* * * * *